United States Patent
Lee et al.

(10) Patent No.: US 9,088,013 B2
(45) Date of Patent: Jul. 21, 2015

(54) CASE FOR BATTERY COMPRISING BENT EDGE AND SEAL, AND SECONDARY BATTERY INCLUDING THE CASE

(75) Inventors: Jaewook Lee, Yongin-si (KR); Yongwoo Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 436 days.

(21) Appl. No.: 13/276,829

(22) Filed: Oct. 20, 2011

(65) Prior Publication Data
US 2012/0177984 A1 Jul. 12, 2012

(30) Foreign Application Priority Data
Jan. 10, 2011 (KR) ........................ 10-2011-0002122

(51) Int. Cl.
*H01M 2/04* (2006.01)
*H01M 2/08* (2006.01)
*H01M 2/02* (2006.01)

(52) U.S. Cl.
CPC .......... *H01M 2/0237* (2013.01); *H01M 2/0217* (2013.01); *H01M 2/043* (2013.01); *H01M 2/08* (2013.01); *H01M 2/0473* (2013.01)

(58) Field of Classification Search
CPC ... H01M 2/02; H01M 2/0237; H01M 2/0217; H01M 2/043; H01M 2/08; H01M 2/0473
USPC ......... 429/185, 176, 157, 132, 153, 170, 161, 429/162, 163
See application file for complete search history.

(56) References Cited

U.S. PATENT DOCUMENTS

| | | | | |
|---|---|---|---|---|
| 1,344,771 A | * | 6/1920 | Peabody | 206/524.9 |
| 1,569,125 A | * | 1/1926 | Hazelett et al. | 429/159 |
| 1,640,488 A | * | 8/1927 | Deibel et al. | 429/135 |
| 1,937,045 A | * | 11/1933 | Schulte et al. | 429/159 |
| 2,024,637 A | * | 12/1935 | Geyer | 429/156 |
| 2,391,001 A | * | 12/1945 | Arnoldi | 429/132 |
| 2,542,094 A | * | 2/1951 | Richardson et al. | 429/128 |
| 3,056,850 A | * | 10/1962 | Rauske et al. | 429/157 |
| 3,440,105 A | * | 4/1969 | Masahiro et al. | 429/153 |
| 3,823,039 A | * | 7/1974 | Sanchez | 429/170 |
| 2006/0257731 A1 | | 11/2006 | Yoon | |
| 2008/0096105 A1 | | 4/2008 | Lee et al. | |
| 2009/0206096 A1 | * | 8/2009 | Hirotsu et al. | 220/612 |

FOREIGN PATENT DOCUMENTS

| | | |
|---|---|---|
| JP | 59-228362 A | 12/1984 |
| JP | 63-236255 A | 10/1988 |
| JP | 2004-319176 A | 11/2004 |
| KR | 10-0274891 B1 | 2/2001 |
| KR | 10 2006-0018412 A | 3/2006 |
| KR | 10 2006-0112393 A | 11/2006 |
| KR | 10 2008-0012872 A | 2/2008 |
| KR | 10-2008-0036746 A | 4/2008 |
| KR | 10 2009-0089292 A | 8/2009 |

OTHER PUBLICATIONS

KR Notice of Allowance dated Dec. 3, 2012.

* cited by examiner

*Primary Examiner* — Kenneth Douyette
(74) *Attorney, Agent, or Firm* — Lee & Morse, P.C.

(57) ABSTRACT

A case for a battery includes a body including at least four side parts and a first bent part at an edge of at least one of the side parts, the four side parts being arranged to define a volumetric structure having two open ends, a bottom coupled to one of the open ends of the body, and a seal disposed in a space between the first bent part of the body and an edge of the bottom.

18 Claims, 8 Drawing Sheets

CASE FOR BATTERY COMPRISING BENT EDGE AND SEAL, AND SECONDARY BATTERY INCLUDING THE CASE

BACKGROUND

1. Field

Embodiments relate to a case for a battery and a secondary battery including the case.

2. Description of the Related Art

Secondary batteries are rechargeable batteries, i.e., batteries that are used many times. Such secondary batteries may be used in portable small devices, e.g., cellular phones, notebooks, computers, cameras, camcorders, etc., or may be used as a power source for driving a motor, e.g., of high output hybrid electric vehicles (HEV), electric vehicles (EV), electric scooters, etc. Such a secondary battery may include an electrode assembly, a case accommodating the electrode assembly, and a cap assembly coupled to an upper portion of the case.

SUMMARY

Example embodiments are directed toward a case for a battery and a secondary battery including the case, which prevent a welding leak. Therefore, the secondary battery according to example embodiments exhibits improved safety at a simplified manufacturing process, e.g., reduced manufacturing time and costs.

According to at least one embodiment, a case for a battery may include a body including at least four side parts and a first bent part at an edge of at least one of the side parts, the four side parts being arranged to define a volumetric structure having two open ends, a bottom coupled to one of the open ends of the body, and a seal disposed in a space between the first bent part of the body and an edge of the bottom.

The bottom may contact the first bent part of the body to define a surface contact therebetween, a side portion of the seal being positioned inside the body to contact the surface contact.

The seal may include a plastic resin, an adhesive material, or a metal material having a lower melting point than those of the body and the bottom.

The bottom may be inserted into the open end of the body, a lowest surface of the bottom contacting the first bent part.

The body may include a second bent part at an end of the first bent part.

A side portion of the seal may contact a region where an end of the second bent part meets the bottom.

The bottom may include a bottom part contacting an end of the first bent part, and a first extension, the first extension being bent relative to the bottom part and extends from an end of the bottom part to face the first bent part.

The bottom may further include a second extension that is bent and extends from the end of the first extension.

The body may include aluminum or aluminum alloy, and the bottom includes aluminum, aluminum alloy, or stainless steel.

The bottom may fit into the open end of the body to have a lowest surface of the bottom seal the open end of the body, and the edge of the bottom extends into an interior of the body to overlap at lest a portion of the first bent part.

The bottom may include a first extension portion including the edge of the bottom, the first extension bending in an opposite direction relative to the first bent part of the body.

The first extension and the first bent part may define a space therebetween, the seal filling the space between the first extension and the first bent part.

According to another embodiment, a secondary battery may include an electrode assembly, a case accommodating the electrode assembly and an electrolyte, and a cap assembly coupled to the case, wherein the case has a body having at least four side parts and a first bent part at an edge of at least one of the side parts, the four side parts being arranged to define a volumetric structure having two open ends, a bottom coupled to one of the open ends of the body, and a seal disposed in a space between the first bent part of the body and an edge of the bottom.

A side portion of the seal may contacts a region where an end of the first bent part meets the bottom.

The seal may include a plastic resin, an adhesive material, or a metal material having a lower melting point than those of the body and the bottom.

The bottom may be inserted in the open end of the body.

The body may include a second bent part at an end of the first bent part.

A side portion of the seal may contact a region where an end of the second bent part meets the bottom.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
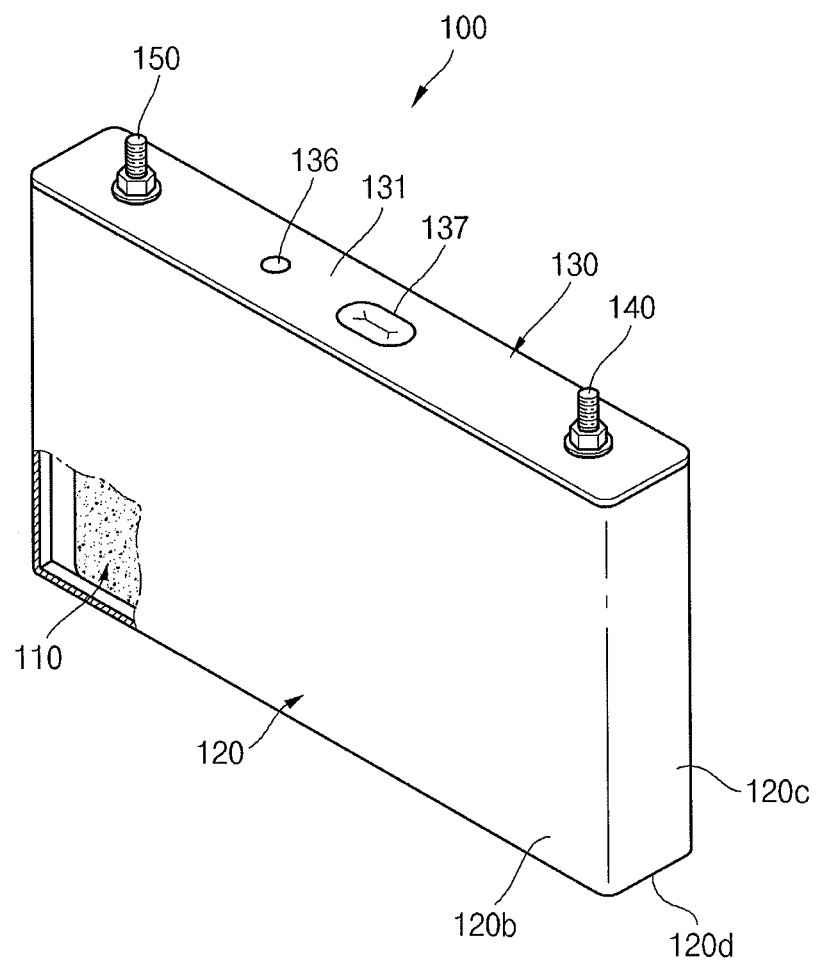
FIG. 1 illustrates a perspective view of a secondary battery including a case for a battery according to an embodiment.

Korean Patent Application No. 10-2011-0002122, filed on Jan. 10, 2011, in the Korean Intellectual Property Office, and entitled: "Case for Battery and Secondary Battery Including Case," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
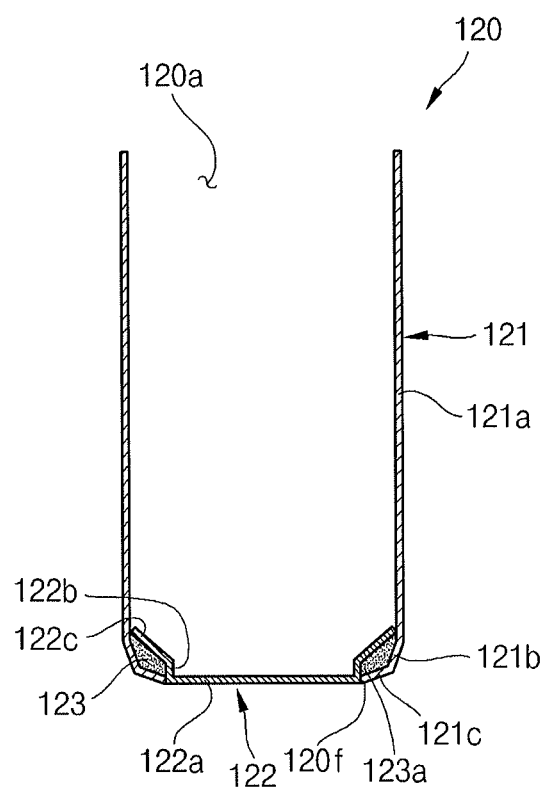
FIG. 2 illustrates a cross-sectional view of the case in FIG. 1.
Figure 3:
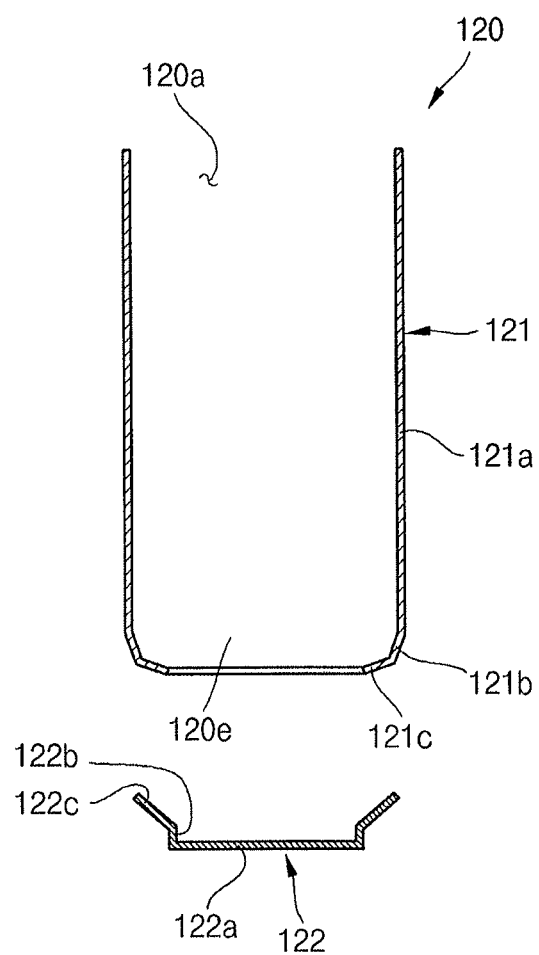
FIG. 3 illustrates an exploded cross-sectional view of the case in FIG. 2.

FIG. 1 illustrates a perspective view of a secondary battery according to an embodiment. FIG. 2 illustrates a cross-sectional view of a case of a secondary battery according to an embodiment, and FIG. 3 illustrates an exploded cross-sectional view of the case in FIG. 2.

Referring to FIG. 1, a secondary battery 100 according to an embodiment may include an electrode assembly 110, a case 120, a cap assembly 130, a first terminal 140, and a second terminal 150. The electrode assembly 110 may be formed by winding or stacking a first electrode plate, a separator, and a second electrode plate, which have thin plate or film shape.

Referring to FIG. 2, the case 120 may include an opening 120a in an upper portion thereof to accommodate the electrode assembly 110 and electrolyte. Referring to FIG. 1, the case 120 may include long sidewalls 120b having a large width, short sidewalls 120c having a smaller width than that of the long sidewalls 120b, and a lower wall 120d connecting the long sidewalls 120b to the short sidewalls 120c. The long sidewalls 120b, short sidewalls 120c, and lower wall 120d may be arranged to form a prismatic shape with an open side, i.e., the opening 120a, as illustrated in FIG. 1, but example embodiments are not limited thereto.

The cap assembly 130 may be coupled to the upper portion of the case 120 to seal the upper portion, i.e., to seal the opening 120a of the case 120. The cap assembly 130 may include a plug 136 closing an electrolyte injection hole, and a vent plate 137 that is designed to open at a set pressure.

The first terminal 140 and the second terminal 150 may be electrically connected to the first electrode plate and the second electrode plate of the electrode assembly 110, respectively. The first terminal 140 and the second terminal 150 may protrude through and out of the cap assembly 130.

The secondary battery 100 including the case 120 described above may be connected to an external electronic apparatus to perform a discharge operation for supplying power to the external electronic apparatus or a charge operation for receiving power from the external electronic apparatus. Hereinafter, the case 120 of the secondary battery 100 will be described in detail.

Referring to FIGS. 2 and 3, the case 120 may include a body 121, a bottom 122, and a seal 123.

The body 121 may have a hollow and elongated structure, and may have a sufficient height to accommodate the electrode assembly 110. The body 121 may be formed of a metal, e.g., aluminum or aluminum alloy, and may include at least four side parts 121a, a first bent part 121b, and a second bent part 121c.

The side parts 121a may be four sidewalls and may correspond to two long sidewalls 120e and two short sidewalls 120c illustrated in FIG. 1. The four side parts 121a may be arranged as a volumetric hollow structure with an open top 120a, i.e., opening 120a, and an open lower end 102e (FIG. 3). For example, the side parts 121a may be integrally formed through an extrusion process. In the extrusion process, raw material is melted, followed by extrusion thereof through a nozzle having a specific shape, and followed by solidification.

The first bent part 121b of the body 121 may be disposed at an end, e.g., terminal edge, of at least one of the side parts 121a. In detail, the first bent part 121b may extend from a lower end of at least one of the side parts 121a, and may be bent, i.e., relative to the side part 121a, toward an interior of the case 120. For example, the first bent part 121b may extend continuously along an entire perimeter of the case 120 to correspond to the long sidewalls 120e and short sidewalls 120c of the case 120. For example, one long sidewall 120b of the case 120 may include one side part 121a integral with one first bent part 121b. As the first bent part 121b is bent toward an interior of the case 120, the first bent part 121b may overlap, in a vertical direction, an edge of the bottom 122 to stably couple the body 121 to the bottom 122, as will be described in more detail below. The first bent part 121b and an end of at least one of the side parts 121a may form an obtuse angle, i.e., as measured along a bending direction of the first bent part 121b. The first bent part 121b may be formed by bending an end of at least one of the side parts 121a.

The second bent part 121c may be disposed at an end of the first bent part 121b. In detail, the second bent part 121c may be bent and may extend from the end of the first bent part 121b to the inside of the side parts 121a. The second bent part 121c may be part of the lower wall 120d of the case 120. The first bent part 121b may form an obtuse angle with the second bent part 121c. The second bent part 121c may be formed by bending the end of the first bent part 121b. The second bent part 121c may extend only to a predetermined length, so that a lower end of the body 121 may be open, i.e., define the open lower end 120b.

The bottom 122 may be inserted into the body 121 through the open lower end 120b of the body 121. Thus, the bottom 122 may be coupled to the body 121. The bottom 122 may be formed of a metal, e.g., aluminum or aluminum alloy, or may be formed of stainless steel to increase its strength. In detail, the bottom 122 may include a bottom part 122a, a first extension 122b, and a second extension 122c.

The bottom part 122a may have a linear structure, and may extend in parallel to a surface supporting the battery 100. A length of the bottom part 122a along a horizontal direction may substantially equal a length of the open lower end 120e of the body 121, so the bottom part 122a may fit into the open lower end 120b and seal the open lower end 120e. As such, the bottom part 122a may contact an end of the second bent part 121c. For example, the bottom part 122a and the second bent part 121c may define the lower wall 120d of the case 120, as illustrated in FIG. 1. The bottom part 122a, i.e., a lowest surface of the bottom 122, may be perpendicular to the side parts 121a.

The first extension 122b may be bent and may extend upward from the end of the bottom part 122a into the interior of the body 121, i.e., when the bottom part 122a fits in the opening of the bottom of the battery body 121. The first extension 122b may face the first bent part 121b and the second bent part 121c. The first extension 122b, the first bent part 121b, and the second bent part 121c may define a space in which the seal 123 is disposed. The first extension 122b may be formed by bending the end of the bottom part 122a, or may be integrally formed with the bottom part 122a through an extrusion process. For example, the first extension 122b may be perpendicular to the bottom part 122a.

The second extension 122c may be bent and may extend laterally from an end of the first extension 122b. The second extension 122c may face the first bent part 121b and the second bent part 121c. The second extension 122c, the first bent part 121b, and the second bent part 121c may form the space in which the seal 123 is disposed. The second extension 122b may be formed by bending the end of the first extension 122b, or may be integrally formed with the bottom part 122a and the first extension 122b through an extrusion process. For example, the first and second extension parts 122b and 122c may overlap, e.g., completely overlap, the first and second bent parts 121b and 121c. For example, the first and second extension parts 122b and 122c may define a bend in an opposite direction with respect to a bend defined by the first and second bent parts 121b and 121c to define a space therebetween to accommodate the seal 123. It is noted that the first bent part 121b with the second bent part 121c or the second bent part 121c alone may be referred to as an edge of the bottom 122.

The seal 123 may be formed in the space between the first bent part 121b and the edge of the bottom 122, e.g., the seal 123 may completely fill the space between the bottom 122 and a lower part of the body 121. A side portion 123a of the seal 123 may contact a region where the bottom 122 meets an end of the second bent part 121c. In other words, the bottom 122, i.e., the bottom part 122a, may contact the second bent part 121c to define a surface contact 120f therebetween, so the side portion 123a of the seal 123 mat contact the surface contact 120e, e.g., the side portion 123a may extend along an entire length of the surface contact 120f to seal potential penetration therethrough. The seal 123 seals a coupling part of the body 121 and the bottom 122 to prevent moisture from being introduced into the case 120 between the body 121 and the bottom 122 or to prevent the electrolyte from leaking out of the case 120 between the body 121 and the bottom 122. The seal 123 may be formed, e.g., of a plastic resin through an insert injection molding process, of an adhesive material through an application process, or of a metal having a melting point lower than those of the body 121 and the bottom 122 through a brazing process.

As described above, the case 120 may include the body 121, the bottom 122, and the seal 123 therebetween. As the seal 123 may block any external moisture or electrolyte leaks between the body 121 and the bottom 122, the bottom 122 may fit into and be affixed to the body 121 without welding, thereby minimizing leaks and reducing manufacturing time and costs. In contrast, when a conventional case is formed by welding a body to a bottom, leaks may occur via the welding lines and manufacturing may be expensive, e.g., due to use of an expensive welding apparatus. According to example embodiments, the secondary battery 100 including the case 120 may have reduced introduction of moisture or electrolyte leakage, thereby exhibiting increased safety. In addition, the case 120 may be manufactured through a simpler process for a shorter time at a lower cost, e.g., as compared to a case that is formed through a complicated deep drawing process.

Figure 4:
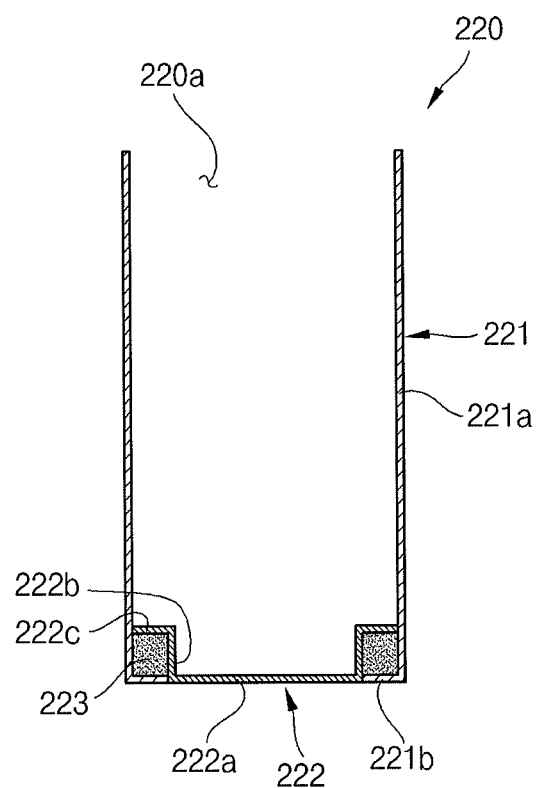
FIG. 4 illustrates a cross-sectional view of a case for a battery according to another embodiment.

A case 220 for a battery according to another embodiment will now be described with reference to FIGS. 4-5. FIG. 4 illustrates a cross-sectional view of a case of a secondary battery according to another embodiment, and FIG. 5 illustrates an exploded cross-sectional view of the case of FIG. 4.

Figure 5:
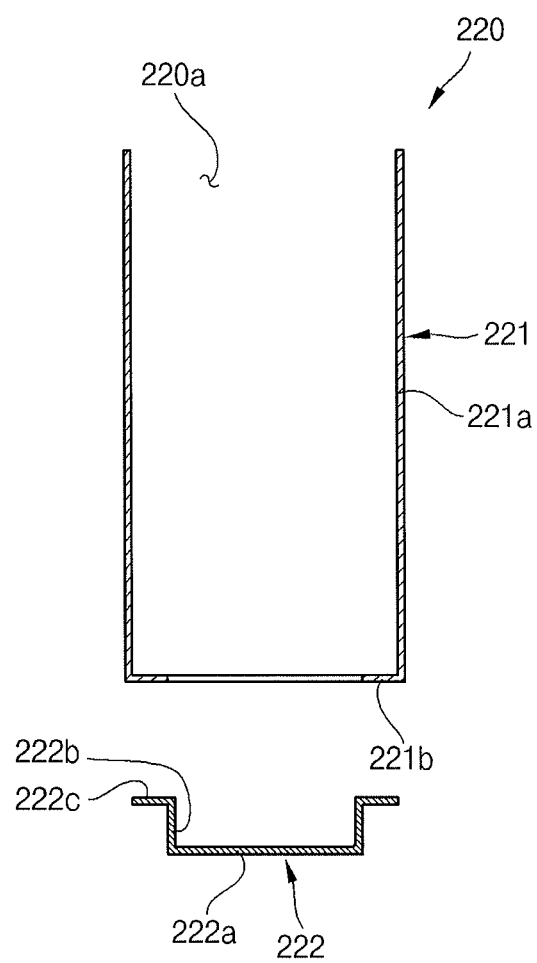
FIG. 5 illustrates an exploded cross-sectional view of the case in FIG. 4.

Referring to FIGS. 4 and 5, the case 220 may include an opening 220a in an upper portion thereof, a body 221, a bottom 222, and a seal 223.

The body 221 may include side parts 221a and a first bent part 221b. The body 221 may be similar to the body 121 illustrated in FIG. 2, with the exception of including only one bent part, i.e., the first bent part 221b. The first bent part 221b may be formed by bending at least one of the side parts 221a using a bending apparatus. For example, the side parts 221a may form a right angle with the first bent part 221b.

The bottom 222 may include a bottom part 222a, a first extension 222b, and a second extension 222c. The bottom 222 may be similar to the bottom 122 illustrated in FIG. 2, with the exception that the bottom part 222a and the first extension 222b form a right angle, and the first extension 222b and the second extension 222c form a right angle. A shape formed by the first extension 222b and the second extension 222c may be approximately symmetrical to a shape formed by the first bent part 221b and ends of the side parts 221a, so as to form a space in which the seal 223 may be disposed.

The seal 223 may be disposed in the space between the end of the bottom 222 and the first bent part 221b, and may be similar to the seal 123 illustrated in FIG. 2. A side portion of the seal 223 may contact a region where an end of the first bent part 221b meets the bottom 222.

As described above, the case 220 may include the body 221, the bottom 222, and the seal 223 therebetween. The body 221 and the bottom 222 may be assembled without welding, thereby preventing a leak that may occur when a case is formed by welding a conventional body to a conventional bottom, and reducing a burden of an expensive welding apparatus. According to the example embodiment, the secondary battery including the case 220 may prevent introduction of moisture or leakage of electrolyte to ensure safety. In addition, the case 220 may be manufactured through a simpler process for a shorter time at a lower cost than those of a case that is formed through a complicated deep drawing process.

Figure 6:
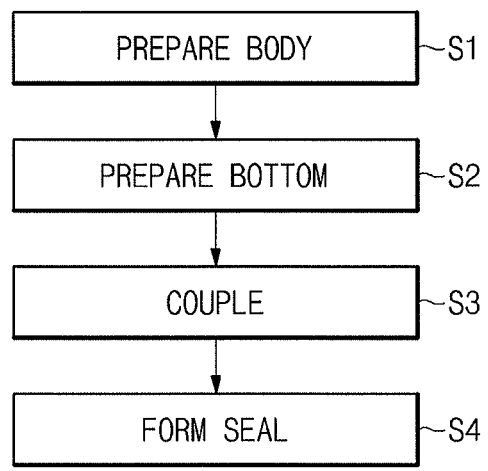
FIG. 6 illustrates a flowchart of a method of manufacturing a case for a battery according to an embodiment.

A method of manufacturing the case 120 according to an embodiment will now be described with reference to FIGS. 6 and 7A-7D. FIG. 6 illustrates a flowchart of a method of manufacturing a case for a battery according to an embodiment, and FIGS. 7A-7D illustrate cross-sectional views of stages in the method of FIG. 6.

Referring to FIG. 6, in a method of manufacturing the case 120 according to an embodiment, a body may be prepared in operation S1, a bottom may be prepared in operation S2, a coupling process, i.e., of the body and the bottom, may be performed in operation S3, and a seal may be formed in operation S4.

Figure 7A:
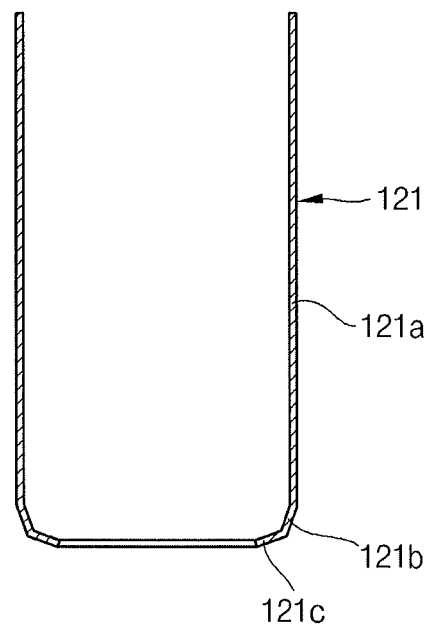
FIGS. 7A through 7D illustrate cross-sectional views of stages in the method of FIG. 6.

In detail, referring to FIG. 7A, the body 121 may be prepared in operation S1. For example, the body 121 may include, e.g., at least, four of the side parts 121a having both open ends, the first bent part 121b formed at an end of at least one of the side parts 121a, and the second bent part 121c formed at an end of the first bent part 121b.

In further detail, in operation S1, the body 121 including the side parts 121a may be formed through an extrusion process, and the first bent part 121b and the second bent part 121c may be formed through a bending process. Through the bending process, the first bent part 121b may form an obtuse angle with an end of at least one of the side parts 121a, and the first bent part 121b may form an obtuse angle with the second bent part 121c.

Figure 7B:
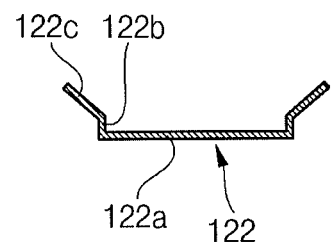

Referring to FIG. 7B, the bottom 122 may be prepared in operation S2. The bottom 122 may include the bottom part 122a, the first extension 122b that is bent and extends from the end of the bottom part 122a, and the second extension 122c that is bent and extends from an end of the first extension 122b.

In detail, in operation S2, the bottom 122 including the bottom part 122a may be formed through an extrusion process, and the first extension 122b and the second extension 122c may be formed through a bending process. The first extension 122b may be bent upward from the end of the bottom part 122a, and the second extension 122c may be bent laterally from the end of the first extension 122b. Through the bending process, a shape formed by the first extension 122b and the second extension 122c may be approximately symmetrical to a shape formed by the first bent part 121b and the second bent part 121c. The first extension 122b and the second extension 122c may be formed simultaneously with the bottom part 122a through a single extrusion process.

Figure 7C:
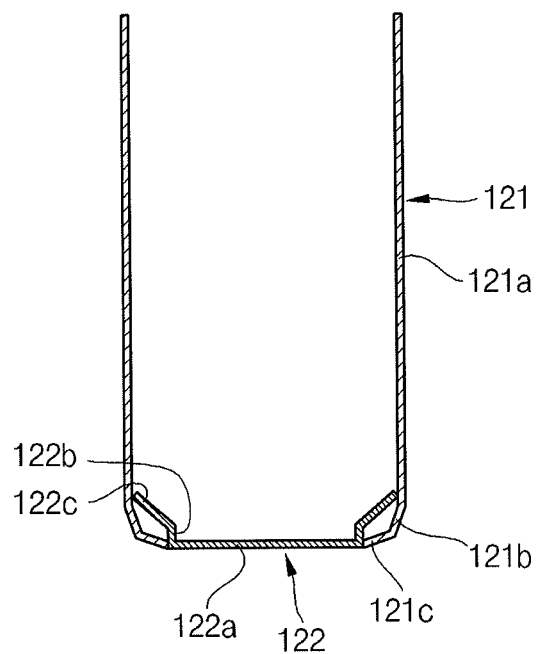

Referring to FIG. 7C, in operation S3, the bottom 122 may be inserted through an opening in a lower part of the body 121, i.e., into the lower portion of the body 121, so that the bottom 122 may be coupled to the body 121. Here, the bottom part 122a may contact the end of the second bent part 121c, and the first extension 122b and the second extension 122c may be disposed inside the first bent part 121b and the second bent part 121c to face the first bent part 121b and the second bent part 121c.

Figure 7D:
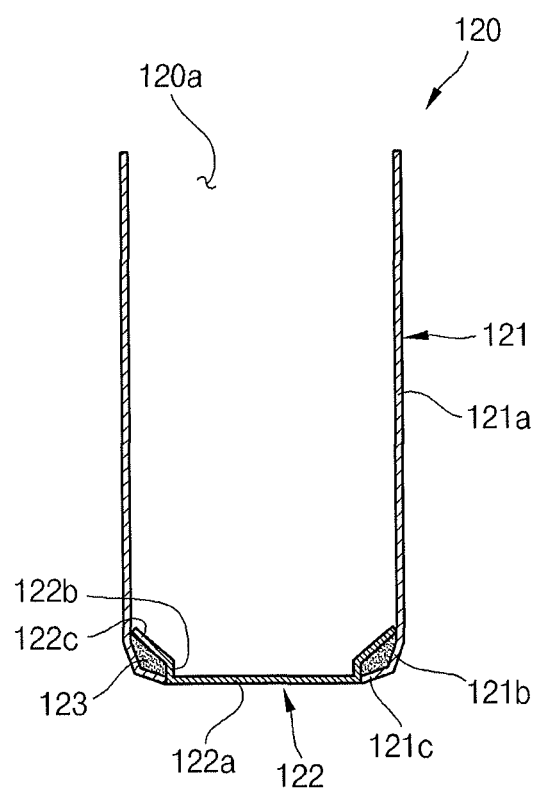

Referring to FIG. 7D, in operation S4, the seal 123 may be formed in the space between the end of the bottom 122 and the first bent part 121b. For example, in operation S4, the seal 123 may be formed of a plastic resin through an insert injection molding process. In another example, the seal 123 may be formed by applying adhesive between the end of the bottom 121 and the first bent part 121b. In this case, the adhesive may be applied on the first bent part 121b and the second bent part 121c, and then, the first extension 122b and the second extension 122c may be attached to the adhesive. In yet another example, the seal 123 may be formed through a brazing process in which the space between the end of the bottom 122 and the first bent part 121b may be filled with metal powder having a lower melting point than those of the body 121 and the bottom 122, and then, the metal powder may be heat-treated and melted. In this case, the metal powder may be heat-treated using a furnace or laser irradiation.

According to the embodiment, a battery case may include a body, a bottom, and a seal therebetween, without using welding. Therefore, leaks caused by welding may be prevented. Further, the expense of a welding apparatus may be eliminated. According to the embodiment, the secondary battery including the case may prevent or substantially minimize introduction of moisture or leakage of electrolyte to ensure safety. Further, according to the embodiment, the case may be manufactured through a simpler process for a shorter time at a lower cost than those of a case that is formed through a complicated deep drawing process.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A case for a battery, comprising:
a body including at least four side parts and a first bent part at an edge of at least one of the side parts, the four side parts and first bent part being arranged to define a volumetric structure having two open ends;
a bottom coupled to one of the two open ends of the body, the bottom including
a bottom part at a lowest portion of the bottom, and
an extension that is bent and extends from an end of the bottom part, wherein the extension is surrounded by the first bent part, and an end of the extension contacts the side parts and an end of the first bent part contacts the bottom part so that an enclosed sealing space is formed between the first bent part and the extension; and
a seal including a sealing material disposed in the enclosed sealing space defined by the first bent part of the body and the extension, the enclosed sealing space wholly inside the volumetric structure of the body.

2. The case as claimed in claim 1, wherein the bottom contacts the first bent part of the body to define a surface contact therebetween, a side portion of the seal being positioned inside the body to contact the surface contact.

3. The case as claimed in claim 1, wherein the sealing material includes a plastic resin, an adhesive material, or a metal material having a lower melting point than those of the body and the bottom.

4. The case as claimed in claim 1, wherein the bottom is inserted into the open end of the body.

5. The case as claimed in claim 1, wherein the body includes a second bent part at an end of the first bent part.

6. The case as claimed in claim 5, wherein a side portion of the seal contacts a region where an end of the second bent part meets the bottom.

7. The case as claimed in claim 1, wherein
extension extends from the end of the bottom part to face the first bent part.

8. The case as claimed in claim 1, wherein the extension includes a first extension extending from the end of the bottom part and bent relative thereto and a second extension that is bent and extends from an end of the first extension.

9. The case as claimed in claim 1, wherein the body includes aluminum or aluminum alloy, and the bottom includes aluminum, aluminum alloy, or stainless steel.

10. The case as claimed in claim 1, wherein the bottom fits into the open end of the body to have a lowest surface of the bottom seal the open end of the body, and an edge of the bottom extends into an interior of the body to overlap at least a portion of the first bent part.

11. The case as claimed in claim 1, wherein the extension bends in an opposite direction relative to the first bent part of the body.

12. The case as claimed in claim 11, wherein the sealing material fills the enclosed sealing space defined by the extension and the first bent part.

13. A secondary battery, comprising:
an electrode assembly;
a case accommodating the electrode assembly and an electrolyte; and
a cap assembly coupled to the case,
wherein the case includes:
a body having at least four side parts and a first bent part at an edge of at least one of the side parts, the four side parts and first bent part being arranged to define a volumetric structure having two open ends,
a bottom coupled to one of the two open ends of the body, the bottom including
a bottom part at a lowest portion of the bottom, and
an extension that is bent and extends from an end of the bottom part, wherein the extension is surrounded by the first bent part, and an end of the extension contacts the side parts and an end of the first bent part contacts the bottom part so that an enclosed sealing space is formed between the first bent part and the extension, and
a seal including a sealing material disposed in the enclosed sealing space defined by the first bent part of the body and the extension, the enclosed sealing space wholly inside the volumetric structure of the body.

14. The secondary battery as claimed in claim 13, wherein a side portion of the seal contacts a region where an end of the first bent part meets the bottom.

15. The secondary battery as claimed in claim 13, wherein the sealing material includes a plastic resin, an adhesive material, or a metal material having a lower melting point than those of the body and the bottom.

16. The secondary battery as claimed in claim 13, wherein the bottom is inserted in the open end of the body.

17. The secondary battery as claimed in claim 13, wherein the body includes a second bent part at an end of the first bent part.

18. The secondary battery as claimed in claim 17, wherein a side portion of the seal contacts a region where an end of the second bent part meets the bottom.

* * * * *